United States Patent
Cremin

(10) Patent No.: US 9,141,724 B2
(45) Date of Patent: Sep. 22, 2015

(54) TRANSCODER HINTING

(75) Inventor: Ronan Cremin, Dublin (IE)

(73) Assignee: Afilias Technologies Limited, Dublin (IE)

( * ) Notice: Subject to any disclaimer, the term of this patent is extended or adjusted under 35 U.S.C. 154(b) by 276 days.

(21) Appl. No.: 12/762,521

(22) Filed: Apr. 19, 2010

(65) Prior Publication Data

US 2011/0258250 A1 Oct. 20, 2011

(51) Int. Cl.
- *G06F 15/16* (2006.01)
- *G06F 17/30* (2006.01)
- *H04L 29/08* (2006.01)

(52) U.S. Cl.
CPC .......... *G06F 17/30905* (2013.01); *H04L 67/02* (2013.01); *H04L 67/04* (2013.01)

(58) Field of Classification Search
USPC ......... 709/203, 206, 246, 217, 218, 219, 227, 709/228, 229, 230, 231, 232, 236; 715/760, 715/236, 238, 234, 243, 810, 771, 204, 205, 715/800, 864, 513, 517, 815, 249, 733, 801
See application file for complete search history.

(56) References Cited

U.S. PATENT DOCUMENTS

| | | | |
|---|---|---|---|
| 5,884,246 A | | 3/1999 | Boucher et al. |
| 6,112,192 A | * | 8/2000 | Capek ............................ 705/59 |
| 6,421,733 B1 | * | 7/2002 | Tso et al. ...................... 709/246 |
| 6,565,609 B1 | * | 5/2003 | Sorge et al. ................... 715/234 |
| 6,611,876 B1 | | 8/2003 | Barrett et al. |
| 6,613,098 B1 | * | 9/2003 | Sorge et al. ................... 715/234 |
| 6,615,212 B1 | | 9/2003 | Dutta et al. |
| 6,662,218 B2 | * | 12/2003 | Mighdoll et al. ............. 709/219 |
| 6,747,365 B2 | | 6/2004 | Reinold et al. |
| 6,760,711 B1 | | 7/2004 | Gillett et al. |
| 6,888,837 B1 | | 5/2005 | Cunningham et al. |
| 6,925,595 B1 | * | 8/2005 | Whitledge et al. ........... 715/234 |
| 6,944,665 B2 | * | 9/2005 | Brown et al. ................. 709/227 |
| 6,957,394 B1 | * | 10/2005 | Fernandez et al. ............ 715/760 |
| 7,093,029 B2 | * | 8/2006 | Brown et al. ................. 709/246 |
| 7,178,101 B2 | * | 2/2007 | Tunning ........................ 715/236 |
| 7,388,844 B1 | * | 6/2008 | Brown et al. ................. 370/252 |
| 7,414,743 B2 | * | 8/2008 | Komaki ....................... 358/1.13 |
| 7,574,486 B1 | * | 8/2009 | Cheng et al. .................. 709/219 |

(Continued)

FOREIGN PATENT DOCUMENTS

| | | |
|---|---|---|
| AU | 2008203506 | 8/2008 |
| CN | 201181942 | 1/2009 |

(Continued)

OTHER PUBLICATIONS

International Search Report for International (PCT) Patent Application No. PCT/EP2011/058137, mailed Jul. 18, 2011, 3 pages.

(Continued)

*Primary Examiner* — Saket K Daftuar
(74) *Attorney, Agent, or Firm* — Sheridan Ross P.C.

(57) ABSTRACT

A transcoding system (1) comprises a mobile communication device (2) that retrieves a web resource from a web server (6) using a mobile communication network (3) and the internet (4) via a transcoder (5). The transcoder (5) transcodes the web resource before delivering it to the mobile communication device (2). The process of transcoding the web page is carried out based on style sheet classes and/or meta tags in the web page. This allows a web site owner (7) to control the actions of the transcoder (5) in transcoding the web page.

15 Claims, 4 Drawing Sheets

(56) References Cited

U.S. PATENT DOCUMENTS

| | | | |
|---|---|---|---|
| 7,584,423 B2* | 9/2009 | Rohrabaugh et al. | 715/238 |
| 7,823,083 B2* | 10/2010 | Rohrabaugh et al. | 715/815 |
| 7,827,312 B2* | 11/2010 | Ramaswamy et al. | 709/246 |
| 7,831,926 B2* | 11/2010 | Rohrabaugh et al. | 715/800 |
| 7,904,455 B2* | 3/2011 | Chiu et al. | 707/737 |
| 7,962,640 B2 | 6/2011 | Lee | |
| 7,970,801 B1* | 6/2011 | Defrang et al. | 707/809 |
| 8,041,346 B2 | 10/2011 | Tyhurst et al. | |
| 8,081,956 B2 | 12/2011 | Aaltonen et al. | |
| 2002/0003547 A1 | 1/2002 | Wang et al. | |
| 2002/0103881 A1 | 8/2002 | Granade et al. | |
| 2002/0120684 A1 | 8/2002 | Christfort et al. | |
| 2002/0133569 A1 | 9/2002 | Huang et al. | |
| 2002/0186248 A1 | 12/2002 | Ramanathan et al. | |
| 2002/0190876 A1 | 12/2002 | Lai et al. | |
| 2002/0198937 A1 | 12/2002 | Diwan et al. | |
| 2003/0004984 A1 | 1/2003 | Chou | |
| 2003/0009567 A1 | 1/2003 | Farouk | |
| 2003/0023756 A1 | 1/2003 | Awamoto et al. | |
| 2003/0061288 A1* | 3/2003 | Brown et al. | 709/206 |
| 2003/0061299 A1* | 3/2003 | Brown et al. | 709/214 |
| 2003/0091166 A1 | 5/2003 | Hershenson | |
| 2003/0172186 A1 | 9/2003 | Dunn et al. | |
| 2003/0184789 A1* | 10/2003 | Komaki | 358/1.13 |
| 2003/0229718 A1 | 12/2003 | Tock et al. | |
| 2004/0015567 A1 | 1/2004 | Ziebold et al. | |
| 2004/0049574 A1 | 3/2004 | Watson et al. | |
| 2004/0064469 A1 | 4/2004 | Takahashi et al. | |
| 2004/0117197 A1 | 6/2004 | Dutta et al. | |
| 2004/0148571 A1 | 7/2004 | Lue | |
| 2004/0205621 A1* | 10/2004 | Johnson et al. | 715/523 |
| 2004/0205650 A1 | 10/2004 | Cheng | |
| 2004/0228343 A1 | 11/2004 | Molteni et al. | |
| 2004/0243931 A1 | 12/2004 | Stevens et al. | |
| 2004/0255244 A1* | 12/2004 | Filner et al. | 715/517 |
| 2004/0267610 A1 | 12/2004 | Gossett et al. | |
| 2005/0015365 A1 | 1/2005 | Kavacheri et al. | |
| 2005/0015474 A1 | 1/2005 | Kavacheri et al. | |
| 2005/0132286 A1 | 6/2005 | Rohrabaugh et al. | |
| 2005/0160065 A1* | 7/2005 | Seeman | 707/1 |
| 2005/0234864 A1 | 10/2005 | Shapiro | |
| 2006/0015358 A1 | 1/2006 | Chua | |
| 2006/0036767 A1 | 2/2006 | Ryan | |
| 2006/0230100 A1* | 10/2006 | Shin et al. | 709/203 |
| 2007/0027672 A1 | 2/2007 | Decary et al. | |
| 2007/0168465 A1* | 7/2007 | Toppenberg et al. | 709/218 |
| 2007/0176796 A1* | 8/2007 | Bliss et al. | 340/995.14 |
| 2007/0180432 A1 | 8/2007 | Gassner et al. | |
| 2007/0288841 A1* | 12/2007 | Rohrabaugh et al. | 715/513 |
| 2007/0294646 A1* | 12/2007 | Timmons | 715/864 |
| 2008/0022374 A1 | 1/2008 | Brown et al. | |
| 2008/0028335 A1* | 1/2008 | Rohrabaugh et al. | 715/800 |
| 2008/0065980 A1 | 3/2008 | Hedbor | |
| 2008/0071857 A1 | 3/2008 | Lie | |
| 2008/0077855 A1* | 3/2008 | Lev et al. | 715/236 |
| 2008/0201452 A1 | 8/2008 | Athas et al. | |
| 2008/0235566 A1* | 9/2008 | Carlson et al. | 715/205 |
| 2008/0288475 A1 | 11/2008 | Kim et al. | |
| 2009/0089448 A1* | 4/2009 | Sze et al. | 709/231 |
| 2009/0089668 A1* | 4/2009 | Magnani et al. | 715/273 |
| 2009/0094137 A1* | 4/2009 | Toppenberg et al. | 705/27 |
| 2009/0204808 A1 | 8/2009 | Guo et al. | |
| 2009/0210514 A1 | 8/2009 | Davis et al. | |
| 2009/0300111 A1* | 12/2009 | Rana | 709/203 |
| 2009/0319778 A1 | 12/2009 | Rzepecki et al. | |
| 2010/0005310 A1 | 1/2010 | Gentry et al. | |
| 2010/0017464 A1* | 1/2010 | Cheng et al. | 709/203 |
| 2010/0017502 A1* | 1/2010 | Cheng et al. | 709/219 |
| 2010/0043017 A1 | 2/2010 | Paul et al. | |
| 2010/0095024 A1 | 4/2010 | Wyler et al. | |
| 2010/0114982 A1 | 5/2010 | Ferrell et al. | |
| 2010/0146413 A1 | 6/2010 | Yu | |
| 2010/0199195 A1* | 8/2010 | Carounanidy et al. | 715/760 |
| 2010/0199197 A1* | 8/2010 | Faletski et al. | 715/760 |
| 2010/0274870 A1 | 10/2010 | Cremin et al. | |
| 2010/0299395 A1* | 11/2010 | Klassen | 709/206 |
| 2011/0047249 A1 | 2/2011 | Pearce | |
| 2011/0078120 A1 | 3/2011 | Tyhurst et al. | |
| 2011/0099467 A1* | 4/2011 | Kapur et al. | 715/236 |
| 2011/0231782 A1* | 9/2011 | Rohrabaugh et al. | 715/760 |
| 2011/0289316 A1 | 11/2011 | Cremin et al. | |
| 2011/0307776 A1 | 12/2011 | Cremin | |
| 2012/0011446 A1 | 1/2012 | Harvin et al. | |

FOREIGN PATENT DOCUMENTS

| | | |
|---|---|---|
| EP | 0940960 | 9/1999 |
| EP | 1376990 | 1/2004 |
| EP | 1641211 | 3/2006 |
| EP | 1923798 | 5/2008 |
| EP | 2077521 | 7/2009 |
| GB | 2445667 | 7/2008 |
| WO | WO 98/56159 | 12/1998 |
| WO | WO 01/22683 | 3/2001 |
| WO | WO 01/30043 | 4/2001 |
| WO | WO 01/88733 | 11/2001 |
| WO | WO 02/087135 | 10/2002 |
| WO | WO 2004/040481 | 5/2004 |
| WO | WO 2004/088951 | 10/2004 |
| WO | WO 2006/008559 | 1/2006 |
| WO | WO 2007/089320 | 8/2007 |
| WO | WO 2007/137166 | 11/2007 |
| WO | WO 2008/073207 | 6/2008 |
| WO | WO 2009/012461 | 1/2009 |
| WO | WO 2009/036318 | 3/2009 |
| WO | WO 2009/047783 | 4/2009 |
| WO | WO 2009/051471 | 4/2009 |

OTHER PUBLICATIONS

Written Opinion for International (PCT) Patent Application No. PCT/EP2011/058137, mailed Jul. 18, 2011, 5 pages.

Nelson, "Fast string searching with Suffix Trees," published Aug. 1, 1996, at http://marknelson.us/1996/08/01/suffix-trees, 11 pages.

Parziale et al., "TCP/IP Tutorial and Technical Overview (IBM Redbook)," IBM Redbooks, Dec. 2006, at http://www.redbooks.ibm.com/redbooks/pdfs/gg243376.pdf, pp. 426-480.

Trevor et al., "From Desktop to Phonetop: A UI for Web Interaction on Very Small Devices," Proceedings of the 14th Annual ACM Symposium on User Interface Software and Technology, 2001, at http://jonathantrevor.net/trevor/papers/uist2001.pdf, pp. 121-130.

International Search Report for International (PCT) Patent Application No. PCT/GB/2009/000401, dated Mar. 5, 2010.

Written Opinion for International (PCT) Patent Application No. PCT/GB209/000401, dated Mar. 5, 2010.

Search Report for UK Patent Application No. GB082585.0, mailed Jun. 23, 2008, 4 pages.

International Search Report for International (PCT) Patent Application No. PCT/GB2009/002420, mailed Mar. 3, 2010, 4 pages.

Written Opinion for International (PCT) Patent Application No. PCT/GB2009/002420, mailed Mar. 3, 2010, 5 pages.

Official Action for U.S. Appl. No. 12/867,465, mailed Jan. 31, 2012 12 pages.

Official Action for U.S. Appl. No. 12/760,205, mailed Feb. 21, 2012 20 pages.

ESPN, Dec. 12, 2007, Internet Archive, http://web.archive.org/web/20071212030046/http://espn.go.com, 3 pages.

Official Action for U.S. Appl. No. 12/760,205, mailed Jul. 17, 2012 17 pages.

Official Action for U.S. Appl. No. 12/783,424, mailed Jul. 23, 2012 12 pages.

Official Action for U.S. Appl. No. 12/867,465, mailed Aug. 27, 2012 12 pages.

Aho et al., Data Structures and Algorithms, Bell Telephone Laboratories, Inc., 1983, pp. 162-169.

Comer, "Heuristics for Trie Index Minimization," Feb. 1977, 24 pages.

"WURFL: WAP Universal Resource File," Sourceforge.net, Oct. 21, 2002, [retrieved on Nov. 12, 2012], 31 pages. Retrieved from: http://web.archive.org/web/20021021032915/http://wurfl.sourceforge.net/.

(56) References Cited

OTHER PUBLICATIONS

Third Party Observation filed Dec. 17, 2012 for European Patent Application No. EP 20090710546, 8 pages.
Notice of Allowance for U.S. Appl. No. 12/760,205, mailed Nov. 6, 2012, 5 pages.
Notice of Allowance for U.S. Appl. No. 12/760,205, mailed Dec. 19, 2012, 2 pages.
Official Action for U.S. Appl. No. 12/867,465, mailed Dec. 26, 2012, 13 pages.
Official Action for U.S. Appl. No. 12/867,465, mailed Jul. 15, 2013, 13 pages.
Official Action for U.S. Appl. No. 13/123,378, mailed Dec. 14, 2012, 17 pages.
Official Action for U.S. Appl. No. 13/123,378, mailed May 10, 2013, 16 pages.

* cited by examiner

① Ph: 888-283-0550  Map/Address
Midlands Honda
*124 Killian Commons
ParkwayColumbia,SC29203*
Sales: 888-283-1006
Service: 888-283-0550
Home
Inventory
  New Inventory
  New Specials
  Pre-Owned Inventory
  Certified Honda Vehicles
  Pre-Owned Specials
  Featured Vehicles
  Bargain Inventory
  Cash For Clunkers
Build / Research
  Vehicle Showroom
  Vehicle Reviews
  FAQ
  Quick Quote
  CarFinder
Finance Center
  Finance Center
  Finance Application
  Finance Specials
  Finance Estimator
Parts
  Parts Center
  Parts Order Form
  Parts Specials
Service
  Service Center
  Service Request

FIG. 5A

FIG. 5B desktop site
Instant Mobilizer by dotMobi

FIG. 6A

FIG. 6B

TRANSCODER HINTING

FIELD OF THE INVENTION

The present invention relates to the delivery of web resources to mobile communication devices. It particular, but not exclusively, the invention relates to the transcoding of web resources for delivery to mobile communication devices.

BACKGROUND TO THE INVENTION

Most web resources are intended for use by desktop and laptop personal computers (PCs). This means they are often unsuitable for use by mobile communication devices. Web resources, typically web sites and web pages, may include elements such as script, graphics, animations, video data, audio data, layouts etc. that are not supported by a mobile communication device. For example, a web site may include an object encoded using Java® or Adobe® Flash script, but a mobile communication device may not have the correct software to use such an object. Similarly, an image on a web site may be too large to be displayed on a mobile communication device.

In light of this, web resources specifically encoded for use by mobile communication devices are sometimes provided. Usually, web resources specifically encoded for use by mobile communication devices are based on web resources intended for use by PCs. For example, an organisation may have two web sites, one for use by PCs and the other specifically encoded for use by mobile communication devices. There is therefore duplication of effort in providing the same content for use by both PCs and mobile communication devices. For this reason, only large and well resourced organisations or those with a particular reason to target mobile communication devices tend to provide web resources that are specifically encoded for mobile communication devices. There is therefore a need to make it easier to provide web resources suitable for use by mobile communication devices.

In order to address this need, it is known to convert web resources intended for use by PCs to be suitable for use by mobile communication devices. This conversion is known as transcoding. In one example, the transcoding is carried out by a mobile network operator, although transcoding can be carried out by other entities, such as search engines or third parties that offer a transcoding service. When the user of a mobile communication device seeks to retrieve a given web resource via the mobile communication network, instead of the mobile communication device being provided with the web resource itself, it is provided with a transcoded version of the web resource.

In more detail, the mobile communication device may send a request for a web resource, which request includes an internet domain name, e.g. "www.bobspizzashop.com". The mobile network retrieves the web resource from the web server using the internet domain name (or, more specifically, an Internet Protocol (IP) address for the server at which the web resource is located, which IP address can be retrieved from the domain name system (DNS) of the internet using the internet domain name). However, instead of delivering the web resource straight to the mobile communication device, the mobile communication network first transcodes the web resource.

Typically, the transcoding involves identifying the type of mobile communication device that made the request and adapting the web resource to be suitable for that device. For example, if the web resource is encoded using script that is not supported by the type of mobile communication device, the web resource may be converted to script that is supported by the mobile communication device. Similarly, an image included in the web resource may be resized to suit the limitations of the display of the mobile communication device.

Although transcoding can significantly improve the presentation of web resources to users of mobile communication devices, the results are not always ideal. The variety and complexity of web resources designed for PCs is such that there is great difficulty in providing a transcoding system that is able to produce effective results in all circumstances.

Moreover, transcoding is often undertaken independently of the owner of the web resource. As such, the owner of the web resource has little control over the results of the transcoding process. Accordingly, the owners of web resources cannot control user experience of their web resources.

It is known to use style sheets to allow a single web resource to be rendered differently by different browsers. A style sheet is a programming construct used to control the presentation of elements provided in mark-up language, such as hypertext mark-up language (HTML). When a browser renders a web resource, such as a web page, it uses rules contained in the style sheet to determine how to present elements provided in mark-up language. In order to effect this styling, a style sheet class is included in the web page to identify a given element, while the style sheet itself provides the rules as to how elements having this style sheet class should be rendered. For example, the initial text in the web page might be identified by the style sheet class "heading" and the style sheet for the style sheet class "heading" might indicate the font size or colour of the text.

A conventional style sheet language is known as cascading style sheets (CSS). CSS specifies a priority scheme to determine which rule is applied to a style sheet class when more than one rule is provided for that style sheet class. In practice, the different rules may originate from different style sheets. This priority scheme gives rise to the cascade from which CSS gets its name. Different browsers may therefore apply different rules from the style sheet, leading to different presentation of the web resource.

However, style sheets only provide limited assistance in the provision of web resources to a mobile communication device. In particular, style sheets do not modify a web resource optimised for use by PCs before it is delivered to the mobile communication device. Instead, style sheets only take effect when the web resource is rendered by the mobile communication device. This limits the value of the style sheets, as the mobile communication device must download the web resource before applying any rules contained in the style sheets. For example, where a web resource optimised for a PC contains an object encoded using Java® or Adobe® Flash script that cannot be displayed by the mobile communication device, the use of style sheets will not prevent that object being downloaded to the mobile communication device, even if it will prevent any effort being made to display it. This is an unnecessary drain on the bandwidth of the mobile communication device's connection to the internet. Effective use of such bandwidth is of particular importance in the context of mobile communication devices.

SUMMARY OF THE INVENTION

According to a first aspect of the present invention, there is provided a method of providing a web resource to a mobile communication device, comprising
  retrieving a web resource;
  transcoding the web resource so as to be suitable for the mobile communication device; and delivering the transcoded web resource to the mobile communication device, wherein the step of transcoding the web resource is carried out based on at least one style sheet class provided in the web resource.

According to a second aspect of the present invention, there is provided an apparatus for providing a web resource, the apparatus comprising a transcoder for:

retrieving a web resource;

transcoding the web resource so as to be suitable for the mobile communication device; and delivering the transcoded web resource to the mobile communication device, wherein the step of transcoding the web resource is carried out based on at least one style sheet class provided in the web resource.

So, the present invention enables the use of style sheet classes to control the transcoding of a web resource. As the style sheet classes are carried by the web resource, rather than being inherent to the transcoder, this allows the owner of the web resource to influence the transcoding process. Moreover, style sheet classes are not themselves directly rendered by web browsers accessing the web resource, meaning that the introduction of style sheet classes for use during transcoding of web resources need not have any effect on the rendering of the web resource in a conventional browser. In particular, the style sheet class provided in the web resource and upon which transcoding of the web resource is based is preferably not defined in any associated style sheet. Without an associated style sheet, the style sheet class is ignored by a conventional browser.

Preferably, the step of transcoding the web resource comprises altering mark-up language of the web resource based on the at least one style sheet class. As the mark-up language defines the elements that make up the content of the web page, this means that the at least one style sheet class is effective to alter the content of the transcoded web page, rather than simply the styling. The changes made to the transcoded web resource are therefore able to have a substantive effect on the utility of the transcoded web resource and the efficiency of its delivery to the mobile communication device. Notably, this goes beyond the effects obtained by the conventional use of style sheet classes and style sheets, which only take effect when the mobile communication device renders the web resource.

In some preferred embodiments, the step of transcoding comprises removing at least one element from the web resource based on the at least one style sheet class. This reduces the size of the transcoded web resource, which can be beneficial in the delivery of the web resource to the mobile communication device. It is often the case that web resources designed for personal computers (PCs) include elements that cannot be displayed by a mobile communication device. Moreover, some elements of web resources can be displayed by mobile communication devices, but are inappropriate in any case because, for example, they detract from the user experience of the web resource on the mobile communication device. The preferred embodiments of the present invention are able to remove such elements from the web resource during the transcoding step, thereby avoiding the need to deliver them to the mobile communication device.

In some circumstances, it is beneficial to provide additional elements in a transcoded web resource over those present in the initial web resource. For example, some additional details may be pertinent to a transcoded web resource delivered to a mobile communication device. In some preferred embodiments, therefore, the step of transcoding comprises adding at least one element to the web resource based on the at least one style sheet class.

Preferably, the step of transcoding comprises changing the colour of at least one element of the web resource based on the at least one style sheet class. This can assist in ensuring a pleasing user experience for the user of the mobile communication device.

Preferably, the step of transcoding comprises creating a user-accessible menu based on the at least one style sheet class. It is often the case that menu systems designed for PCs are inappropriate for mobile communication devices. Preferred embodiments of the present invention allow menu structures to be added during the transcoding step in response to the at least one style sheet class. This enables a menu that is suitable for a mobile communication device to be provided to the user.

Preferably, the style sheet classes are cascaded style sheet (CSS) classes. CSS is a known style sheet language which allows style sheets to simultaneously contain different rules for the same style sheet classes. In particular, CSS style sheets are conventionally used to provide different styling instructions to different web browsers.

In preferred embodiments, the step of transcoding is carried out based on meta tags in the web resource. Indeed, the use of meta tags in the web resource to affect transcoding of the web resource is considered novel in of itself, and according to a third aspect of the present invention, there is provided a method of providing a web resource to a user, comprising retrieving a web resource;

transcoding the web resource so as to be suitable for the mobile communication device; and delivering the transcoded web resource to the mobile communication device, wherein the transcoding step is carried out based on a meta tag in the web resource.

According to a fourth aspect of the present invention, there is provided an apparatus for providing a web resource to a user, the apparatus comprising a transcoder for:

retrieving a web resource;

transcoding the web resource so as to be suitable for the mobile communication device; and delivering the transcoded web resource to the mobile communication device, wherein the transcoding step is carried out based on a meta tag in the web resource.

This allows meta tags in the web resource to be used to control the transcoding of the web resource. The meta tags are typically located in mark-up language of the web resource. Preferably, the meta tags are located in a head section of mark-up language of the web resource. This allows the meta tags to be relatively easily located. Accordingly, there is no need to analyse the body of the web resource in detail during the transcoding step in order to locate the meta tags. This means that the transcoding step can be carried out efficiently with minimal delay.

Preferably, the step of transcoding comprises introducing elements into the web resource based on meta tags in the web resource. This allows further elements to be included in the transcoded web resource. For example, the web resource as initially designed for PCs may not display the telephone number of the owner of the web resource. However, in the context of delivery of the web resource to a mobile communication device it may be preferable that the telephone number is visible. Meta-tags can be used to cause an element such as the telephone number to be included in the web resource during the transcoding step.

In some preferred embodiments, the step of transcoding is carried out based on the provision of a licence key in a meta tag in the web resource. The licence key can be used to authenticate the web resource as one which is to be transcoded. The license key might also be used to affect the type of transcoding that is undertaken. For example, transcoding may be offered as a service and the licence key may be provided as proof that the service has been purchased. In a more detailed example, transcoding may take place in the absence of the licence key but the licence key is needed for the transcoding to take account of rules in the style sheet and/or meta tags in the web resource.

In preferred embodiments, the step of delivering the transcoded web resource occurs across a network. Preferably, the network is or comprises a mobile communication network. By transcoding the web resource before it is delivered across a network, the present invention makes more effective use of the limited bandwidth of networks to which mobile communication devices are connected.

Use of the words "apparatus", "transcoder" and so on are intended to be general rather than specific. Whilst these features of the invention may be implemented using an individual component, such as a computer or a central processing unit (CPU), they can equally well be implemented using other suitable components or a combination of components. For example, the invention could be implemented using a hard-wired circuit or circuits, e.g. an integrated circuit, or using embedded software. It can also be appreciated that the invention can be implemented, at least in part, using computer program code. According to another aspect of the present invention, there is therefore provided computer software or computer program code adapted to carry out the method described above when processed by a computer processing means. The computer software or computer program code can be carried by computer readable medium. The medium may be a physical storage medium such as a Read Only Memory (ROM) chip. Alternatively, it may be a disk such as a Digital Video Disk (DVD-ROM) or Compact Disk (CD-ROM). It could also be a signal such as an electronic signal over wires, an optical signal or a radio signal such as to a satellite or the like. The invention also extends to a processor running the software or code, e.g. a computer configured to carry out the method described above.

Preferred embodiments of the invention are described below, by way of example only, with reference to the accompanying drawings.

BRIEF DESCRIPTION OF THE DRAWINGS

FIG. 5A illustrates a transcoded web page derived from a third example web page and transcoded without the use of style sheet classes or meta data;

FIG. 5B illustrates a transcoded web page derived from the third example web page and transcoded according to a preferred embodiment of the present invention;

FIG. 6A illustrates a transcoded web page derived from a fourth example web page and transcoded without the use of style sheet classes or meta data; and FIG. 6B illustrates a transcoded web page derived from the fourth example web page and transcoded according to a preferred embodiment of the present invention.

DETAILED DESCRIPTION OF THE PREFERRED EMBODIMENTS

Figure 1:
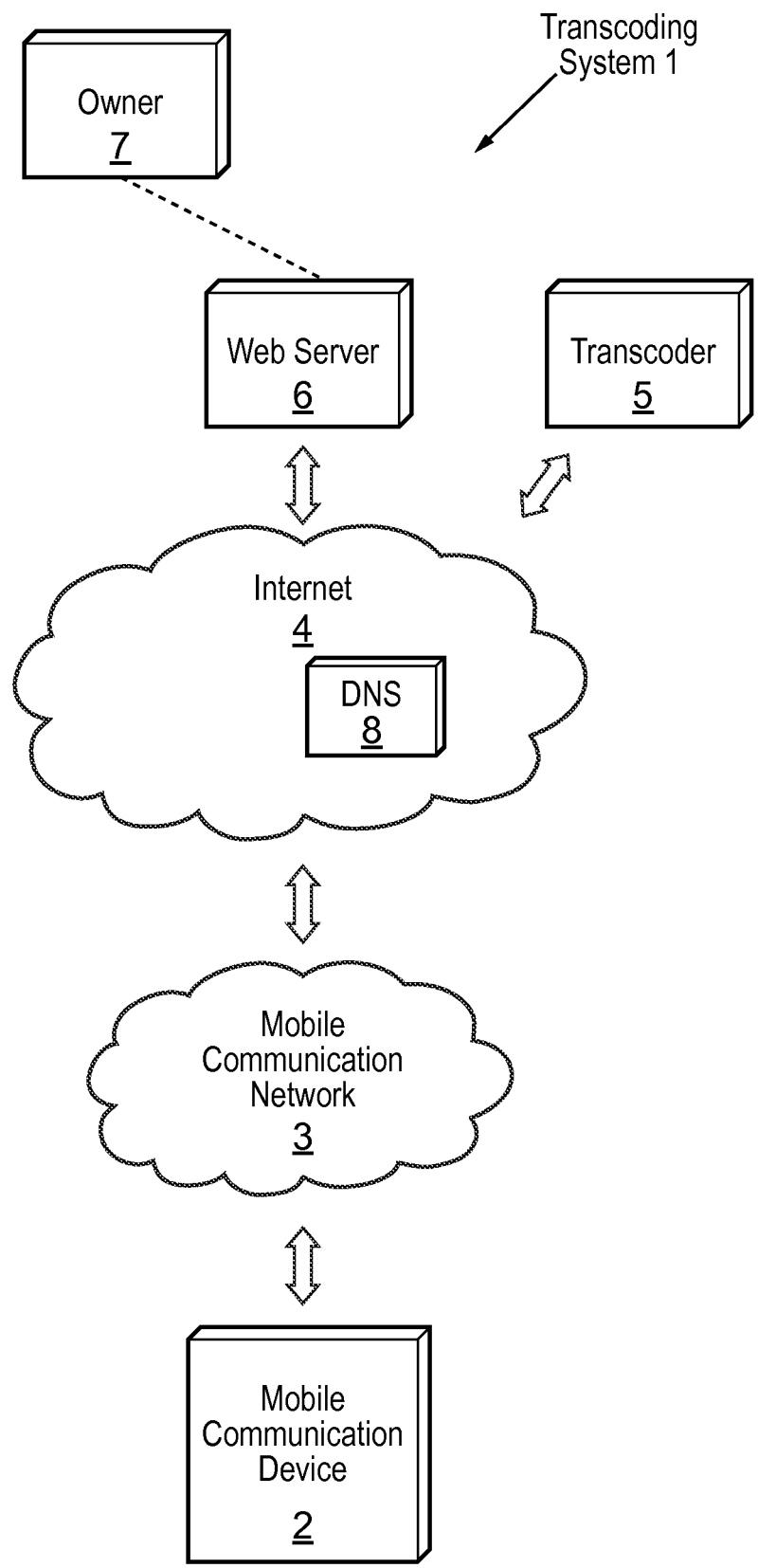
FIG. 1 is a schematic diagram of a transcoding system.

Referring to FIG. 1, a transcoding system 1 comprises a mobile communication device 2, such as a mobile telephone, smart phone, Personal Digital Assistant (PDA) or such like, that retrieves a web resource using a mobile communication network 3 and the internet via a transcoder 5. The mobile communication network 3 is typically a terrestrial or satellite mobile communication network. In other examples, the mobile communication device uses a Wireless Local Area Network (WLAN) or such like to connect to the internet 4 instead of the mobile communication network 3. The mode of connection to the internet 4 is inessential, but the mobile communication device 2 itself is usually characterised by limitations in its ability to use web resources intended for use by desktop and laptop personal computers (PCs).

Web resources include web sites, web pages, feeds, data or video files and so on. In the illustrated example, a web page intended for use by PCs is stored at web server 6. The web page is part of a web site under the control of a web site owner 7. In this example, the web server 6 is also under the control of the web site owner 7, but in other examples the web server 6 may be controlled by another party, such as an Internet Service Provider (ISP), on behalf of the web site owner 7.

The web page comprises mark-up language and a style sheet, which in this case is a cascading style sheet (CSS). The style sheet contains rules that are used by web browsers when rendering the web page to apply styling, such as font types and sizes, to elements of the mark-up language. In order that the correct rules are applied to the correct elements, style sheet classes are included in the mark-up language which identify elements. For example, a text element may be identified with the style sheet class "heading". Web browsers will then use the rules in the style sheet that apply to the style sheet class "heading" when rendering that element. The elements of the mark-up language make up the content of the web page. Therefore, changes to the elements change the content of the web page.

A Domain Name system (DNS) 8 is part of the internet 4 and provides an Internet Protocol (IP) address in response to requests that are made using internet domain names. That is, when the DNS 8 receives a request, it returns the IP address associated with the internet domain name contained in the request. The IP address directs users to the location of a host, such as the web server 6, at which the web resource associated with the internet domain name is stored.

In the following example, the web site owner has registered two internet domain names with the DNS 8. These are "bobspizzashop.com" and "bobspizzashop.mobi". The registered IP address for "bobspizzashop.com" is that of the web server 6. The web server 6 hosts a web page optimised for use by PCs. The registered IP address for internet domain name "bobspizzashop.mobi" is that of the transcoder 5. The transcoder 5 stores a mapping record that relates the internet domain name "bobspizzashop.mobi" to "bobspizzashop.com" as will be explained below.

Figure 2:
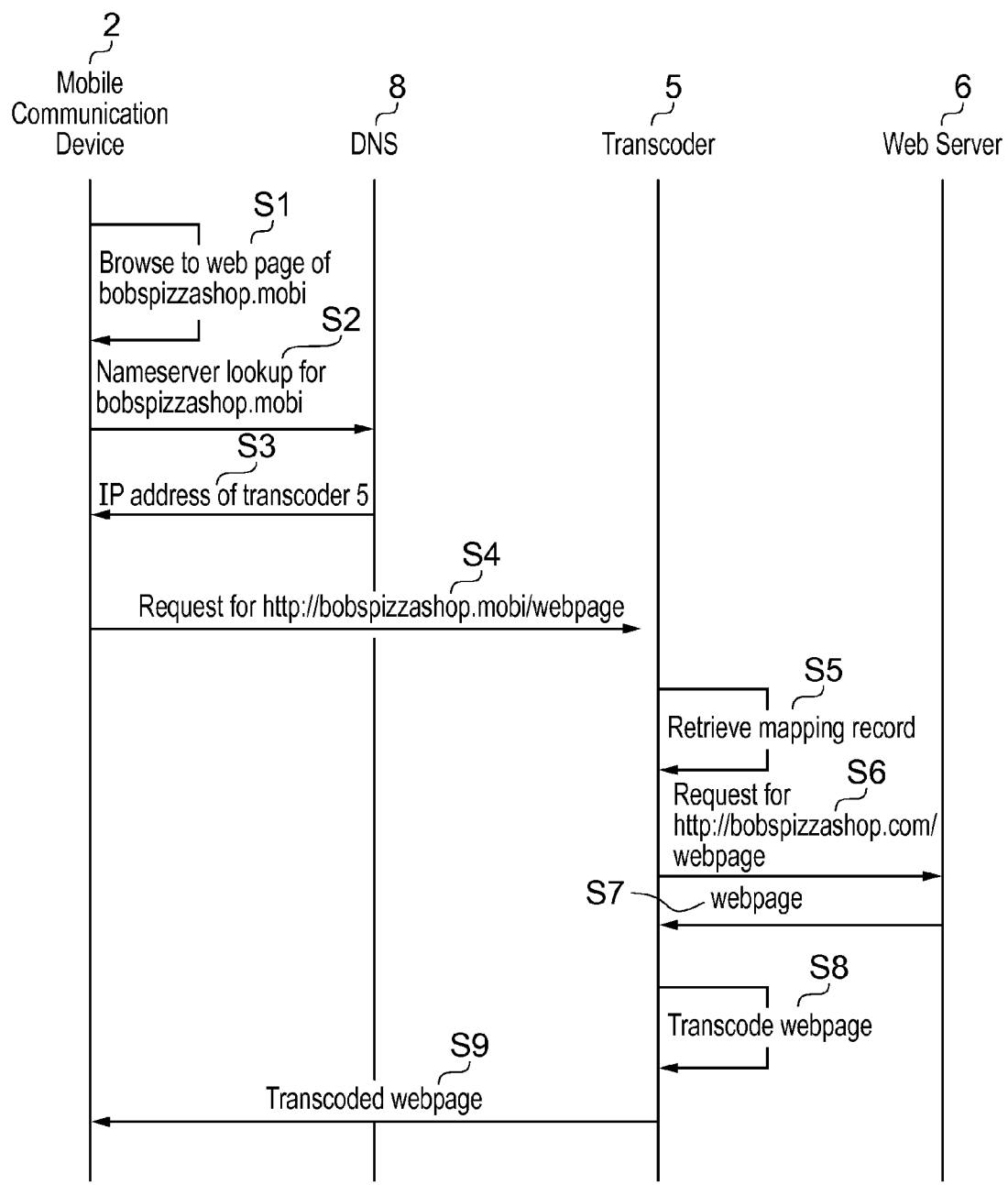
FIG. 2 is a sequence diagram illustrating use of the transcoding system.

Referring to FIG. 2, at step S1 the mobile communication device 2 browses to a web page at the internet domain name "bobspizzashop.mobi". Assuming the mobile communication device 2 does not know the IP address to which this internet domain name relates, this initiates a lookup query to the DNS 8, at step S2. The DNS 8 returns the IP address of the transcoder 5 at step S3. Using this IP address, the mobile communication device 2 sends a HyperText Transfer Protocol (HTTP) request to the transcoder 5 for the web page, e.g. using Uniform Resource Locator "http://bobspizzashop.mobi/webpage", at step S4.

The transcoder 5 recognises the internet domain name "bobspizzashop.mobi" and retrieves, at step S5, the mapping record for the domain name. This retrieval returns the internet domain name of the web site stored on the web server 6, i.e. "bobspizzashop.com". Using this domain name, at step S6 the transcoder 5 sends an HTTP request to the web server 6 for the web page, e.g. using URL "http://bobspizzashop.com/webpage". It may be necessary for the transcoder 5 to perform a lookup query to the DNS 8 in order to establish the IP address of the web server 6 before it can send the HTTP request, but this step is omitted from FIG. 2 for clarity.

The web server 6 returns the web page to the transcoder 5 at step S7. At step S8, the transcoder 5 transcodes the web page. The transcoding typically comprises identifying the type of mobile communication device 2 that requested the web page and altering the web page to be suitable for that mobile communication device 2. Once the web page has been suitably transcoded, the transcoder 5 delivers the transcoded web page to the mobile communication device 2 at step S9. In preferred embodiments, the transcoded web page is delivered to the mobile communication device across the mobile communication network 3. However, the transcoded web page may be delivered to the mobile communication device 3 across any other network as appropriate.

The step S8 of transcoding the web page is carried out based on style sheet classes in the web page. Style sheet classes have conventionally been used to indicate to web browsers which rules in a style sheet are to be used when rendering elements contained in mark-up languages of web pages. Mark-up languages include HyperText Mark-up Language (HTML), eXtended HyperText Mark-up Language (XHTML) and others. Style sheets may be used with any type of mark-up language. A common style sheet language is Cascading Style Sheets (CSS).

The rules contained in CSS are typically used by web browsers to render elements of mark-up language in particular styles. For example, rules in the CSS may define the font size, style and colour of text in the web page. The CSS may also include rules which define further details, such as the location at which images are to rendered on a web page.

Different web browsers have different capabilities, and CSS are able to accommodate this possibility. As such, a web browser will not necessarily execute all the rules contained in a CSS of a web page, but will instead ignore those rules which it cannot apply. Moreover, where a style sheet class is included in a web page and the browser is unable to locate a rule for this style sheet class in the CSS, the browser will ignore that style sheet class when rendering the web page. It is therefore possible to introduce further style sheet classes into the web page without affecting the rendering of the web page by existing browsers.

According to preferred embodiments of the present invention, additional style sheet classes can be added to the web page hosted at web server 6, and these are used by transcoder 5 when transcoding the web page for subsequent delivery to the mobile communication device 2. The style sheet classes may instruct the transcoder 5 to provide a transcoded web page that is altered in a variety of ways. This allows the web site owner 7 to control the transcoding undertaken by the transcoder 5 at least to some extent by providing style sheet classes in the web page.

For example, a style sheet class may instruct the transcoder 5 to remove one or more elements from the web page. In some instances, the web page may include large images which are not capable of display on the mobile communications device. In this case, a style sheet class may instruct the transcoder 5 to remove such images as the web page is transcoded. Similarly, style sheet classes may instruct the transcoder 5 to remove other elements from the web page that are not suitable for the mobile communication device 2. For example, many mobile communication devices 2 are unable to render Java® or Adobe® Flash objects, and style sheet classes may instruct the transcoder 5 to remove such objects from the web page. Video files can often be encoded in formats that cannot be played by mobile communication devices. Style sheet classes in the CSS may instruct the transcoder 5 to remove such videos from the web page, or may instruct that the video is decoded and re-encoded in a format which the mobile communication device 2 can use.

Another aspect of the web page which may be altered by transcoding based on style sheet classes is the layout of the web page. That is, style sheet classes can be used to instruct the transcoder 5 to change the relative locations of elements of the web page. For example, it may be important that the user of the mobile communication device 2 is alerted to the telephone number of the web site owner 7. Accordingly, it may be desirable that this telephone number is displayed prominently on the web page. The telephone number may have been included in the web page designed for PCs but placed in an unobtrusive position (such as at the bottom of the page). Style sheet classes may instruct the transcoder 5 to move the telephone number to a more prominent position in the transcoded web page. For example, style sheet classes may instruct the transcoder to move the telephone number to the top of the web page.

Style sheet classes may also be used to instruct the transcoder 5 to manipulate the layout of the web page in more detail. For example, style sheet classes may instruct the transcoder 5 to create a menu which is appropriate for the mobile communication device 2. This menu can then be accessed by the user of the mobile communication device 2 once the web page is delivered.

In some examples, style sheet classes may be used to identify features of a web page to the transcoder 5. For example, the transcoder 5 may be programmed to arrange the transcoded web page so that the logo of the web site owner 7 is displayed with particular prominence, in terms of location on the web page, size or colour etc. However, this is only possible if the transcoder 5 is able to identify the logo. Accordingly, style sheet classes may be used to identify the logo or any other element of the web page to the transcoder 5.

Style sheet classes may also be used instruct the transcoder 5 to add elements to the web page. For example, the telephone number of the web site owner may not appear on the original web page at all, but may be desirable in a mobile version of the web page. Style sheet classes can be used to indicate the mobile telephone number to the transcoder 5 and instruct that this is added to the web page during transcoding. Similarly, style sheet classes may be used to add other details to the web page, such as the logo or address of the web site owner.

The above referenced rules provide some examples of how style sheet classes can be used to affect the transcoding of the web page undertaken by the transcoder 5. Particular examples of these are discussed in more detail below. The skilled person will understand that other style sheet classes may be used to affect the transcoding as appropriate. Moreover, the skilled person will understand that style sheet classes may be used in isolation or in combination as required.

The following discussion relates to the particular details of exemplary style sheet classes that may be used in accordance with the present invention:

1. IMZ_DISPLAY

This style sheet class can be used to instruct the transcoder 5 to display certain elements on the transcoded web page that do not appear in the original web page. For example, an element could be hidden by default when rendered on a PC, but a style sheet class can instruct that it is included and visible on the transcoded web page. Alternatively, the element could be provided with the style sheet class itself. Example code for the style sheet class IMZ_DISPLAY may read as follows:

```
<h1>Display on Mobile<h1>
We can create somthing that's only visible on the mobile version
<span class="imz_display" style="display: none;">
   <a href="sttp://site.com>Link to Desktop Site</a>
</span>
```

2. IMZ_REMOVE

This style sheet class can be used to instruct the transcoder 5 to remove elements from the transcoded web page. For example, the transcoder 5 may remove large images, Flash objects or any other elements which are not suitable for the mobile communication device 2. Notably, the removed elements are not merely hidden in the transcoded web page but removed entirely such that they do not form part of the transcoded web page and are not delivered to the mobile communication device 2. This speeds up the delivery of the transcoded web page to a user of the mobile communication device 2. Example code for the style sheet class IMZ_REMOVE may read as follows:

```
<h1>Remove on Mobile</h1>
On our desktop site you would see a Flash object here.
<div class="imz_remove">
  <object width="550" height="400">
    <param name="movie" value="somefilename.swf">
    <embed src="somefilename.swf" width="550" height="400">
    </embed>
  </object>
</div>
```

3. IMZ_MENU

This style sheet class can be used to instruct the transcoder 5 to create a menu suitable for use by the mobile communication device 2. The menu may contain unordered lists (UL) or ordered lists (OL) as required. Moreover, the style sheet class can also handle nested ULs and OLs. The menu created in this way may be hidden on the original web page designed for PCs, allowing an entirely separate menu to be provided on the transcoded web page as compared to the original web page. Accordingly, the menu can be optimised for mobile communication devices. Example code for the style sheet class IMZ_MENU may read as follows:

```
<div id="menu">
  <ul class="imz_menu">
    <li><a href="#">menu 1</a></li>
    <li><a href="#">menu 2</a>
      <ul style="display:none">
        <li><a href="#">submenu 2_1</a></li>
        <li><a href="#">submenu 2_2</a></li>
        <li><a href="#">submenu 2_3</a></li>
      </ul>
    </li>
    <li><a href="#">menu 3</a></li>
  </ul>
</div>
```

4. IMZ_COLOR (IMZ_COLOR_XXXXXX)

The style sheet class can be used to instruct the transcoder 5 to alter the colour of element in the web page, such as the foreground colour of text elements in the web page. The transcoder 5 alters the colour to that represented by a six character sequence, XXXXXX, which uses the standard HTML hex colour code. Example code for the style sheet class IMZ_COLOR may read as follows:

```
<h1>Change color on Mobile</h1>
<p class="imz_color_071388 myclass" >
  this div has diffent color on desktop and pc version
</p>
```

5. IMZ_BGCOLOR (IMZ_BGCOLOR_XXXXXX)

This style sheet class can be used to instruct the transcoder 5 to alter the colour of the background for an element. The transcoder 5 alters the background colour to that represented by a six character sequence, XXXXXX, which uses the standard HTML hex colour code. Example code for the style sheet class IMZ_BGCOLOR may read as follows:

```
<h1>Change background color on Mobile</h1>
<p class="imz_bgcolor_D71388 myclass" >
  this DIV has diffent color on desktop and pc version
</p>
These classes can be used simultaneously:
<h1>Change color and background color on Mobile</h1>
<p class="imz_bgcolor_D71388 imz_color_071388 myclass1 myclass2" >
  this div has diffent color and background color on desktop and pc version
</p>
```

The above style sheet classes are provided in the web page, specifically in the mark-up language, and are used by the transcoder 5 in such a way as to affect the mark-up language of the transcoded web page. That is to say, the style sheet classes are used not simply to provide styling hints to the browser when rendering the web page, but to change the content of the web page before delivery to the mobile communication device 2. In this way, the existing structure of web resources, including CSS, is exploited to provide instructions to the transcoder 5 that can be controlled by the web site owner 7.

One way in which style sheet classes may be used to alter the transcoded web page is through the introduction of additional elements into the transcoded web page. Another way of introducing elements to the transcoded web page according to preferred embodiments of the present invention is to include meta tags in the web page. The meta tags are typically included in the mark-up language of the web page, preferably in the head section of the mark-up language.

The meta tags can be read by the transcoder 5, and may instruct the transcoder 5 to include additional elements in the transcoded web page. For example, meta tags may be used to introduce details relating to the web site owner's logo, telephone number or address. The meta tags may also be used, for example, to introduce a link to a Rich Site Summary (RSS) feed into the web page, or to set the time limit before redirection of the user to an alternative web page.

A variety of meta tags may be introduced into the head section of a web page to instruct the transcoder 5 as explained above. An example of a head section of the HTML of a web page containing such meta tags is as follows:

```
<html>
    <head>
        <title>Site/Page Title</title>
        <meta http-equiv="Content-Type" content="text/html; charset=UTF-8">
        <meta name="im_key" content="bf30-4f57-146c-11c6-a4fa-2f">
        <meta name="im_logo_url" content="http://yourdomain.com/images/index_01.gif">
        <meta name="im_logo_alt" content="Logo Alternate Text">
        <meta name="im_phone" content="+353.CALL.US.1200">
        <meta name="im_address" content="42735 Oberlin Elyria Rd, Elyria, OH 44035, USA">
        <meta name="im_refresh" content="0;URL=http://yourdomain.com/html-version.html">
        <meta name="im_feed_url" content="http://yourdomain.com/rss.php">
        <meta name="im_feed_name" content="Company News">
    </head>
```

The basic syntax of the meta tags for this purpose in the preferred embodiment is <meta name="% name" content="% value">. The "meta name" identifies the type of information which is represented by the "content". The "content" might be the information itself (for instance, a phone number) or a link to an address at which that information can be found (in the form of, for example, a URL).

When the web page is transcoded, the transcoder 5 reads the meta tags and adds the required elements to the transcoded web page, using the information it receives from the meta tags about the type of information that is required along with the value of that information. For example, the meta tags may instruct the transcoder 5 to introduce a logo into the transcoded web page. In this case the meta tag might read <meta name="im_logo_url" content="http://yourdomain.com/images/index_01.gif">, where "im_logo_url" indicates to the transcoder 5 that it is a logo being introduced to the web page, while "http://yourdomain.com/images/index_01.gif" is the location of the logo. The transcoder 5 may be arranged to place the image file ("index_01.gif") at the top of the transcoded web page.

Meta tags may also be used for other purposes. For example, meta tags can be used to verify the web site owner 7 to the transcoder 5. For example, the operator of the transcoder 5 may charge a fee to the web site owner 7 for the transcoding service. In order to verify that this fee has been paid, the operator of the transcoder 5 may provide a licence key to the web site owner 7. The web site owner 7 then includes this license key as a meta tag in web page. The transcoder 5 may selectively transcode the web page based on the presence of this key, thereby authenticating that the transcoding service has been validly purchased by the web site owner 7 before carrying out the transcoding process.

In some cases the transcoder 5 may be arranged to automatically introduce additional elements into the transcoded web page by default (i.e. in the absence of instructions from the CSS or meta tags to do so). For example, the transcoder 5 may be arranged to automatically introduce the logo of the operator of the transcoder 5 into the transcoded web page. In preferred embodiments, it is possible to override the automatic introduction of additional elements by the transcoder 5 using a meta tag in the head section of the web page. For example, the transcoder 5 might read the meta tag "<meta name="im_remove_branding" content=true>" to indicate that the logo of the operator of the transcoded web page should not be included in the transcoded web page.

Preferred embodiments of the present invention use style sheet classes and meta tags in the web page to improve the transcoding process undertaken by a transcoder 5, so that a transcoded web page delivered to a mobile communication device 2 is both more aesthetically pleasing and more functional. Advantageously, the web site owner is able to use these features to maintain a degree of control over the transcoding process even if the transcoder 5 is maintained and managed by another party. Moreover, there is no loss of functionality of the web page in terms of its rendering on conventional PCs for which the web page was originally designed.

To illustrate the advantages of the present invention, compare FIGS. 3A, 4A, 5A and 6A with FIGS. 3B, 4B, 5B and 6B. FIGS. 3A, 4A, 5A and 6A illustrate transcoded web pages where no use has been made by the transcoder 5 of style sheet classes or meta tags. FIGS. 3B, 4B, 5B and 6B illustrate the same web pages when transcoded according to preferred embodiments of the present invention. It is clear that the transcoded web pages of FIGS. 3B, 4B, 5B and 6B are of a higher quality than those of FIGS. 3A, 4A, 5A and 6A.

Figure 3A:
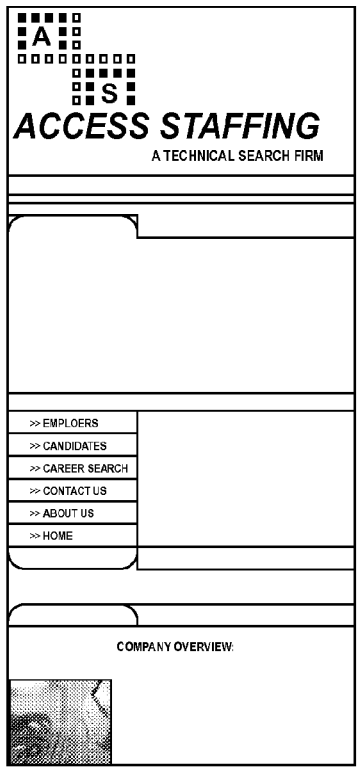
FIG. 3A illustrates a transcoded web page derived from a first example web page and transcoded without the use of style sheet classes or meta data.

For example, the transcoded web page shown in FIG. 3A suffers from a number of defects. In particular, the tabular layout of the original web page has not been successfully dealt with during transcoding, leading to a rendering of the transcoded web page which is neither aesthetically pleasing nor user friendly. Moreover, the telephone number and address information has not been identified during the transcoding, and is not readily accessible in the transcoded web page as a result.

Figure 3B:
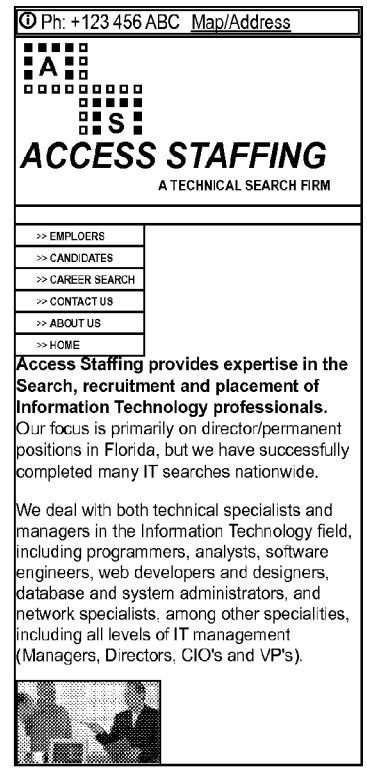
FIG. 3B illustrates a transcoded web page derived from the first example web page and transcoded according to a preferred embodiment of the present invention.

FIG. 3B illustrates a transcoded web page according to a preferred embodiment of the present invention. The original web page that has been transcoded is the same as that transcoded to reach the transcoded web page illustrated in FIG. 3A. In the case of the transcoded web page illustrated in FIG. 3B, it can be seen that the address and phone number information has been identified and provided at the top of the transcoded web page. Moreover, the formatting of the web page is appropriate for a mobile communications device.

Figure 4A:
FIG. 4A illustrates a transcoded web page derived from a second example web page and transcoded without the use of style sheet classes or meta data.

Similarly, the transcoded web page illustrated in FIG. 4A suffers from a number of defects. In this case, the logo of the web site owner has been incorrectly detected. Moreover, the tabular layout of the original web page has caused difficulties in presenting a usable and aesthetically pleasing transcoded web page.

Figure 4B:
FIG. 4B illustrates a transcoded web page derived from the second example web page and transcoded according to a preferred embodiment of the present invention.

FIG. 4B illustrates a transcoded web page according to a preferred embodiment of the present invention. The original web page that has been transcoded is the same as that transcoded to reach the transcoded web page illustrated in FIG. 4A. There are significant improvements in the transcoded web page of FIG. 4B. In particular, the logo of the web page has been correctly detected and displayed prominently at the top of the page. Moreover, a much more pleasing menu colour scheme has been adopted for the mobile communications device 2.

Another example of a transcoded web page suffering from defects is illustrated in FIG. 5A. In this case, a large collapsing menu has been poorly rendered which leads to a confusing array of options for the user. Moreover, the logo of the web site owner has not been correctly identified and displayed. Finally the colour scheme of the original web page has not been effectively reflected by the transcoded web page.

FIG. 5B illustrates a transcoded web page according to a preferred embodiment of the present invention. The original web page that has been transcoded is the same as that transcoded to reach the transcoded web page illustrated in FIG. 5A. It can be clearly seen that the transcoded web page of FIG. 5B does not suffer from the same defects as that of FIG. 5A. In particular, the transcoded web page illustrated in FIG. 5B shows: a menu system which is simplified and more appropriate for mobile use; a successfully identified and prominently displayed logo of the website owner; and a more effective colour scheme.

FIG. 6A illustrated another example of a transcoded web page which suffers from various defects. In particular, the original web page in this case contained a number of complex elements including Javascript and a Flash block. When rendered on the mobile communication device, this has resulted in a large empty space on the transcoded web page. Moreover, the logo of the web site owner has been incorrectly identified.

FIG. 6B illustrates a transcoded web page according to a preferred embodiment of the present invention. The original web page that has been transcoded is the same as that transcoded to reach the transcoded web page illustrated in FIG. 6A. The transcoded web page illustrated in FIG. 6B clearly shows the logo of the web site owner and also leaves no undesired blank space.

The described embodiments of the invention are only examples of how the invention may be implemented. Modifications, variations and changes to the described embodiments will occur to those having appropriate skills and knowledge. These modifications, variations and changes may be made without departure from the scope of the invention defined in the claims and its equivalents.

The invention claimed is:

1. A method of providing a web resource to a first browser and to a mobile communication device, one or more processors executing the method comprising
    storing the web resource on a server with one or more instructions as to how the web resource should be transcoded for the mobile communication device;
    retrieving the web resource with one or more instructions from the server;
    rendering the web resource in the first browser;
    transcoding the web resource using a transcoding system and based on a tag in the web resource so the web resource is suitable for the mobile communication device based on the instructions; and
    delivering the transcoded web resource to the mobile communication device across a network,
    wherein the instructions are provided in at least one style sheet class of the web resource that is ignored when the web resource is rendered by the first browser.

2. A method according to claim 1, wherein the step of transcoding the web resource comprises altering mark-up language of the web resource based on the at least one style sheet class.

3. A method according to claim 1, wherein the step of transcoding comprises removing at least one element from the web resource based on the at least one style sheet class.

4. A method according to claim 1, wherein the step of transcoding comprises adding at least one element to the web resource based on the at least one style sheet class.

5. A method according to claim 1, wherein the step of transcoding comprising changing the colour of at least one element of the web resource based on the at least one style sheet class.

6. A method according to claim 1, wherein the step of transcoding comprises creating a user-accessible menu based on the at least one style sheet class.

7. A method according to claim 1, wherein the style sheet class is a cascaded style sheet class.

8. A method according to claim 1, wherein the tag is a meta tag in the web resource.

9. A method according to claim 8, wherein the meta tag is contained in a head section of mark-up language of the web resource.

10. A method according to claim 8, wherein step of transcoding comprises introducing elements into the web resource based on meta-tags in the web resource.

11. A method according to claim 8, wherein the step of transcoding is carried out based on the provision of a license key in the meta tag.

12. A method according to claim 1, wherein the step of delivering the transcoded webpage occurs across a network.

13. A method according to claim 1, wherein the network is a mobile communication network.

14. A non-transitory computer-readable medium storing instructions for carrying out the method of claim 1, wherein the one or more processors execute the instructions.

15. An apparatus for providing a web resource to a first browser and to a mobile communication device, the apparatus comprising:
    a server on which the web resource is stored with one or more instructions as to how the web resource should be transcoded for the mobile communication device;
    the first browser on which the web resource is rendered; and
    a transcoder that:
        retrieves the web resource;
        transcodes the web resource based on a tag in the web resource so the web resource is suitable for the mobile communication device; and
        delivers the transcoded web resource to the mobile communication device across a network,
    wherein the instructions are provided in at least one style sheet class of the web resource that is ignored when the web resource is rendered by the first browser.

* * * * *